United States Patent [19]

Koken

[11] 4,025,986
[45] May 31, 1977

[54] APPARATUS AND METHOD FOR SKINNING ANIMAL CARCASSES

[75] Inventor: Ernest E. Koken, Madison, Wis.

[73] Assignee: Oscar Mayer & Co. Inc., Madison, Wis.

[22] Filed: Jan. 26, 1976

[21] Appl. No.: 652,050

[52] U.S. Cl. .................................... 17/21; 17/50
[51] Int. Cl.² ........................................ A22B 5/16
[58] Field of Search ............ 17/21, 50, 14, 18, 52, 17/51, 62, 44.2; 99/587, 594, 584

[56] References Cited

UNITED STATES PATENTS

| 2,649,881 | 8/1953 | Runnells, Jr. et al. ............... 17/21 |
| 3,308,502 | 3/1967 | Bednarz et al. ...................... 17/21 |
| 3,424,217 | 1/1969 | Burch ................................... 17/50 |

FOREIGN PATENTS OR APPLICATIONS

| 84,135 | 8/1976 | Germany ............................. 17/21 |
| 84,437 | 9/1971 | Germany ............................. 17/21 |
| 46,678 | 3/1966 | Germany ............................. 17/21 |

Primary Examiner—Louis G. Mancene
Assistant Examiner—James D. Hamilton
Attorney, Agent, or Firm—Lockwood, Dewey, Zickert & Alex

[57] ABSTRACT

A machine for removing skin from animal carcasses, and particularly hog carcasses, which includes an upstanding inclined from the vertical rotatable cylinder having an axially extending slot, a skin clamp at the slot for clamping a portion of the skin to the cylinder, a stationary peel bar positioned adjacent the cylinder and against which a carcass engages during the skinning operation, a fluid drive for closing the skin clamp and rotating the cylinder, and spray nozzles for cleaning the cylinder and peel bar following a skinning operation. A system is provided for automatically handling the carcasses moving to and from the machine.

16 Claims, 12 Drawing Figures

APPARATUS AND METHOD FOR SKINNING ANIMAL CARCASSES

This invention relates in general to a skinning machine, and more particularly to a hog skinning machine where substantially all of the skin is removed from the hog at one time, and still more particularly to an automatically operable skinning machine for effecting successive skinning operations on hog carcasses.

Heretofore, it has been known to generally skin carcasses of animals by hand skinning methods where the skin is separated from the carcass by use of a knife. However, such hand skinning methods are time-consuming and result in the removal of considerable fat with the skin, which is undesirable. It is preferable to maintain fat on the carcass for the cuts of meat when the carcass is butchered rather than to recover the fat from the skin of the animal. Moreover, hand skinning methods have usually been done after the animal has been sectioned, thereby resulting in producing relatively small skin pieces that are later processed into leather. Accordingly, it will be appreciated that skinning according to this invention will provide larger pieces of skin that may have greater utility when processed into leather. Further, it is well known that machine skinning, which effectively pulls skin from the carcass, leaves greater amounts of fat on the carcass.

Machines have also been known for skinning animal carcasses, such as hogs, as shown in U.S. Pat. No. 3,308,502. Moreover, it has been known to provide a rotatable cylinder and skin clamp assembly for skinning hogs, as in East German Pat. No. 46,678, where the cylinder is rotatable along the horizontal axis. It has also been known to provide a hog skinning machine where a skinning cylinder and clamp are utilized and the skinning cylinder is mounted upright and somewhat inclined from the vertical.

However, heretofore known skinning machines have not been satisfactory because of their structure. Further, these machines have required manual operation and have not provided for cleaning between skinning operations.

The hog skinning machine of the present invention includes an upright cylinder rotatable along an axis somewhat inclined from the vertical and having an external skinning face with an axially extending slot where a skin clamp is located. Accordingly, the skin clamp is at the face of the cylinder for clamping skin thereto. The skin clamp includes a clamp anvil at one edge of the slot and a movable clamp bar coacting with the anvil to clamp a portion of skin from a carcass at the cylinder face. The cylinder is rotatably mounted on a drive shaft having connected thereto for rotation therewith a clamp actuating hub that drives a linkage which pivotally moves the clamp bar into engagement with the clamp anvil. Once skin is held by the skin clamp, further rotation of the shaft in the same direction continues to generate clamping pressure on the skin, connects the cylinder to the shaft through the clamp, and drives the cylinder through a skinning cycle. A peel bar is mounted adjacent the cylinder face against which a hog carcass is stopped during the pulling of the skin by the cylinder, thereby peeling the skin from the hog carcass. The carcass rotates against the peel bar during the skinning operation. The greater the resistance of skinning, the more pressure applied by the skin clamp which has a self-generating closing action.

The shaft on which the cylinder is mounted and at which the clamp bar is connected is driven through a fluid transmission system which limits the torque and slips during an overload to thereby protect all of the parts of the machine. At the end of the skinning cycle, the hog carcass is removed from the machine and the return cycle of the machine is initiated where reverse rotation of the shaft initially opens the skin clamp to allow th skin to fall from the machine when the skin clamp is in fully open position as dictated by a stop. Driving force is applied through the stop to return the cylinder back to home position. A plurality of water spray nozzles are arranged to wash the cylinder face and peel bar during the return cycle. A brake is provided for stopping cylinder rotation at the conclusion of rotation through the skinning and return cycles. A hydraulic retarder is connected to the cylinder for retarding rotation of the cylinder to cause closing and opening of the skin clamp at the start of the skinning and return cycles.

It is therefore an object of the present invention to provide a new and improved skinning machine.

Another object of this invention is in the provision of a hog skinning machine capable of quickly and efficiently removing the skin from a hog which has been prepared to provide a portion of loose skin that may be clamped to a skinning cylinder.

A further object of this invention is in the provision of a hog skinning machine for removing skin from a hog carcass and which machine operates automatically through a skinning cycle and a return cycle and wherein the machine is washed on the return cycle.

A still further object of the present invention is to provide a hog skinning machine utilizing a skinning cylinder which is driven by a fluid transmission system that limits torque and prevents damage of machine parts in the event of overload.

Another object of the present invention is in the provision of a hog skinning machine having a vertically arranged skinning cylinder which is axially slotted and provided with a skin clamp at the slot wherein the pressures developed by the clamp are self-generating and the mechanism for activating the clamp includes levers and links to provide positive and strong clamping action.

A still further object of the invention is in the provision of a skinning machine utilizing a vertically arranged skinning cylinder with a self-closing skin clamp that operates in connection with a hydraulic retarder connected to the cylinder for retarding rotation thereof in either direction.

Another object of the present invention is in the provision of an improved hog skinning machine utilizing a skinning cylinder wherein a brake is provided to stop cylinder rotation at the end of the skinning and return cycles.

A still further object of the present invention is in the provision of a method of handling and skinning hogs wherein an upright skinning cylinder inclined from the vertical automatically provides a skinning operation in conjuction with automatically transferring a hog carcass to and from the machine.

Other objects, features and advantages of the invention will be apparent from the following detailed disclosure, taken in conjunction with the accompanying sheets of drawings, wherein like reference numerals refer to like parts, in which:

Figure 1:
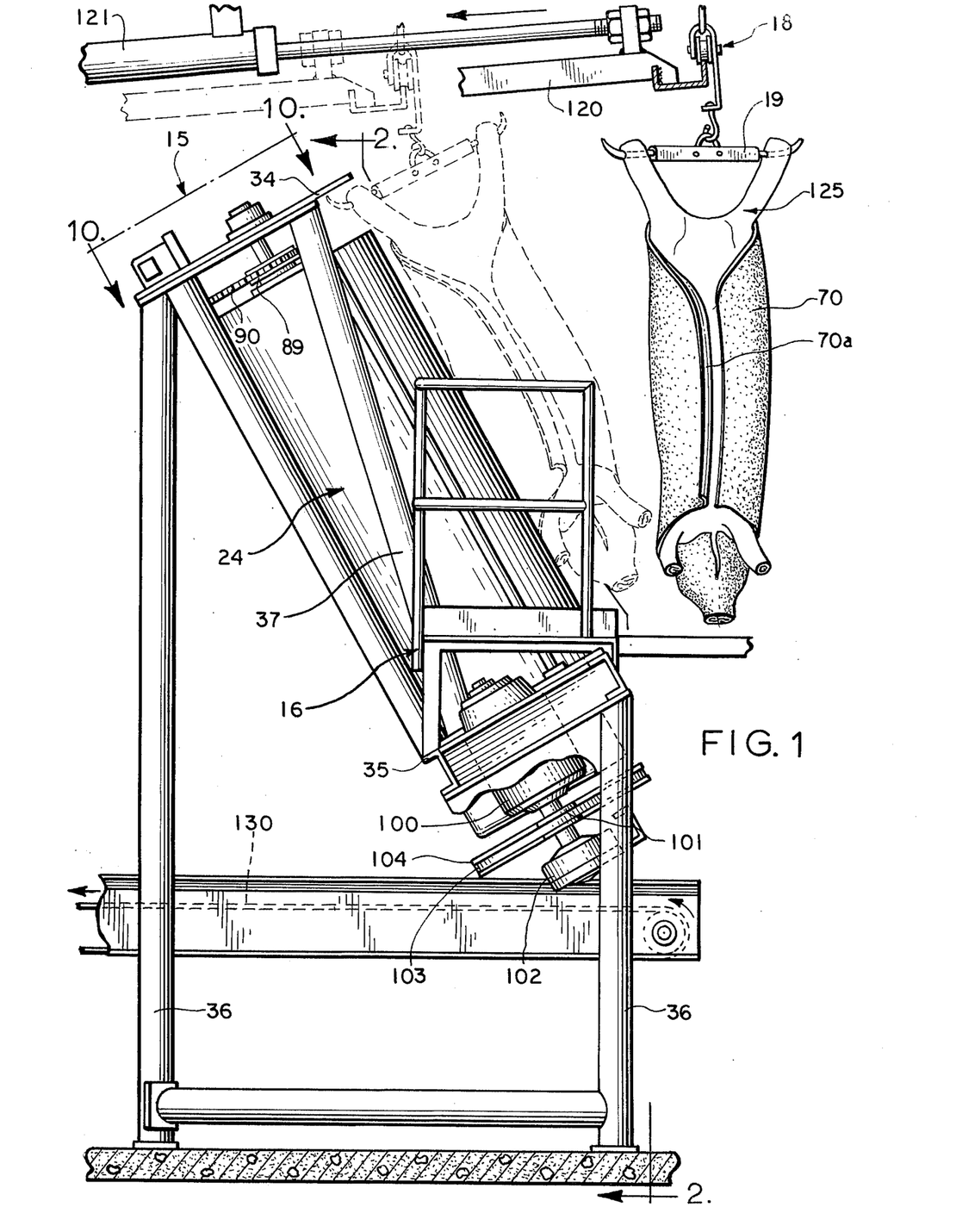
FIG. 1 is a vertical side elevational view of the skinning machine according to the invention and illustrating the manner in which the hog carcass is transferred to the machine from an overhead track run adjacent the machine.
Figure 2:
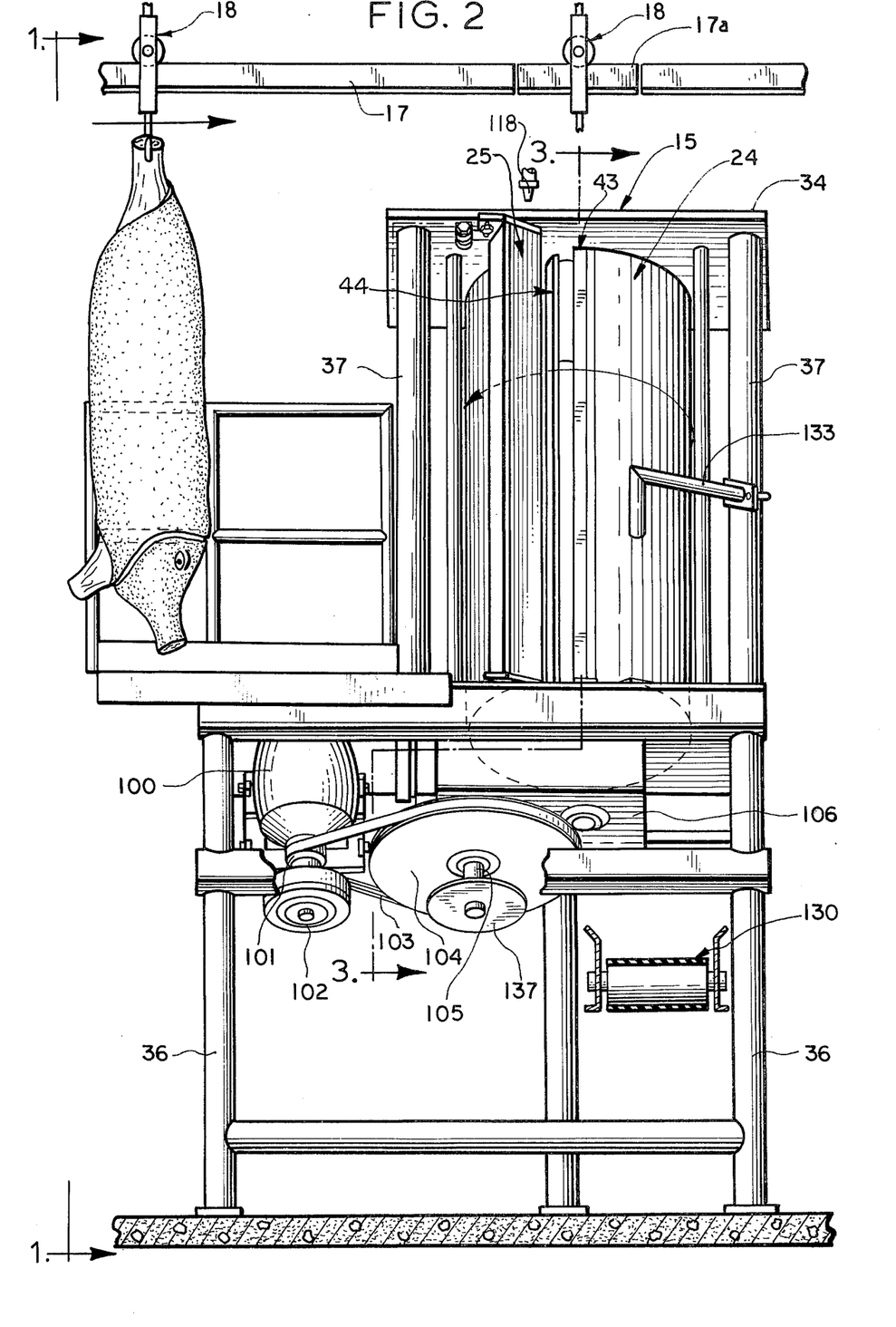
FIG. 2 is a front elevational view of the hog skinning machine shown in FIG. 1 with some parts removed for purposes of clarity and some parts shown in section as taken generally along line 2—2 of FIG. 1.
Figure 3:
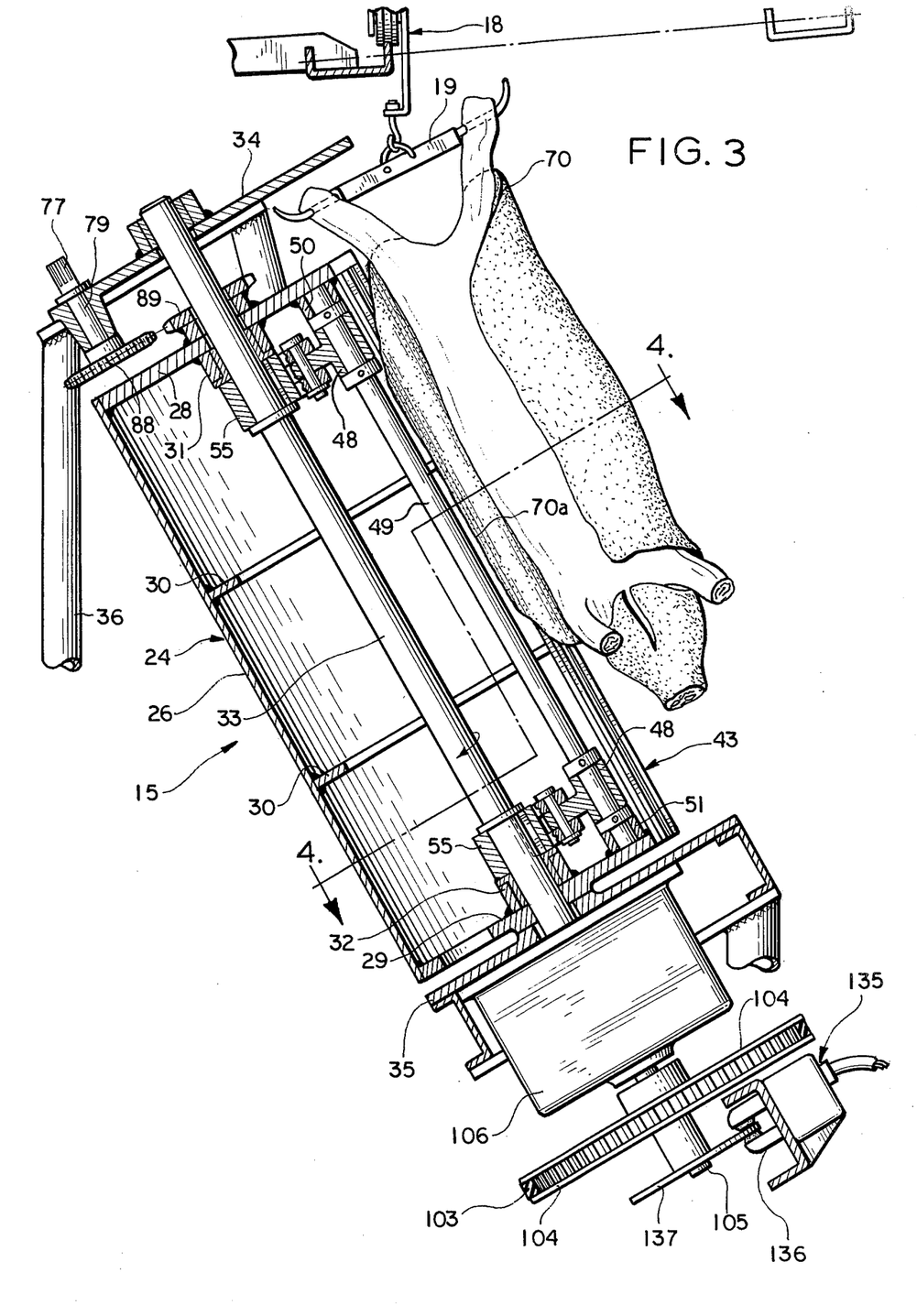
FIG. 3 is a vertical sectional view taken through the hog skinning cylinder and generally along line 3—3 of FIG. 2 and illustrating part of the drive mechanism and also illustrating the manner in which a loose flap of skin from the carcass is inserted into the skin clamp.
Figure 4:
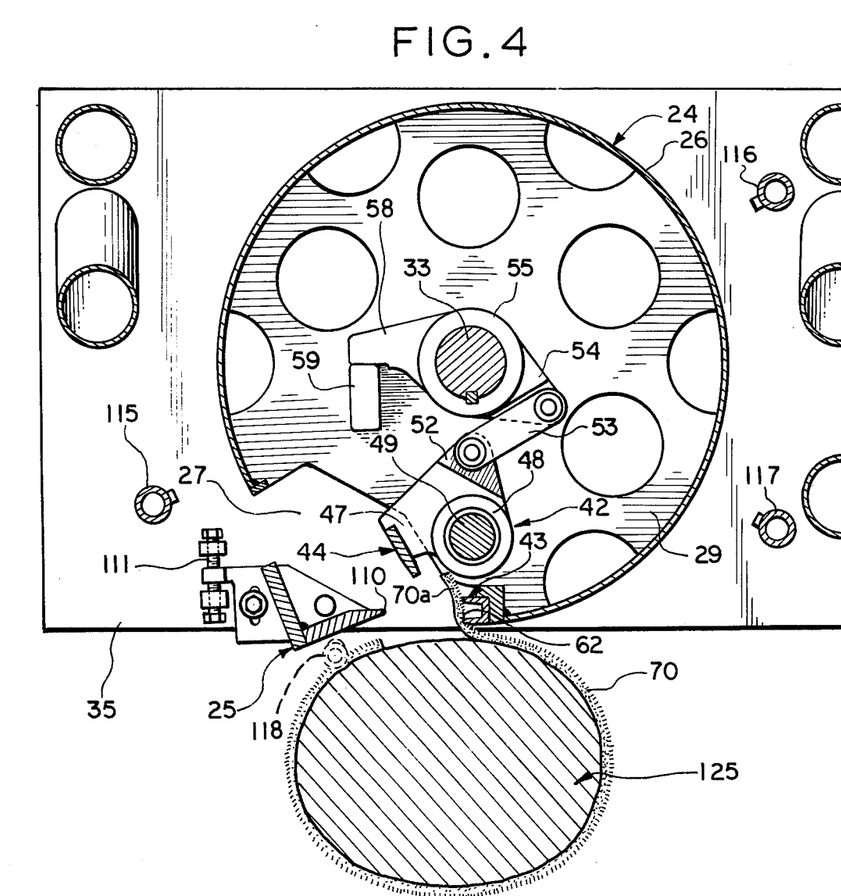
FIG. 4 is an enlarged transverse sectional view taken substantially along line 4—4 of FIG. 3.

Referring now to the drawings, and particularly to FIGS. 1 and 2, the hog skinning machine of the present invention is generally indicated by the numeral 15 and is mounted on a platform elevated above the floor. A part of the platform is shown in FIGS. 1 and 2 and generally designated by the numeral 16. While another part is not shown for purposes of clarity, the platform includes a walking area for the operator of the machine. Adjacent to the machine is a track 17 along which trolleys 18 are guided for movement toward and away from the machine. The trolleys include a hood bar 19 for gambrelling the hind legs of a hog carcass, as shown in FIGS. 1, 2 and 3. The hook bar 19 is pivotally supported by the trolley 18 so that it can rotate a full 360° as is necessary when the hog carcass is subjected to the skinning operation by the machine 15.

The skinning machine according to the invention includes generally a skinning cylinder 24 and a peel bar 25. The skinning cylinder 24 includes a cylindrical wall 26 having an outer face with an axially extending slot 27. The cylinder wall is provided with upper and lower end walls 28 and 29 which are provided with openings therethrough to facilitate washing of the machine when necessary. Additional intermediate re-enforcing members 30 are provided. Bearings 31 and 32 at the upper and lower end walls rotataby support the cylinder on a drive shaft 33. The drive shaft is in turn bearingly mounted in upper and lower mounting plates 34 and 35. The mounting plates are in turn supported above the floor by a plurality of upstanding posts 36, and posts 37 are provieed to support the upper and lower mounting plates relative to each other.

The skinning cylinder is upright and inclined from the vertical about 30 degrees, with the top end being tilted away from the point where a carcass is fed to the machine so that the carcass can easily be laid in position against the cylinder.

A skin clamp 42 is carried on the skinning cylinder 24 for the purpose of clamping skin thereto so that rotation of the skinning cylinder relative the peel bar will peel skin from the carcass of an animal. This skin clamp includes a clamp anvil 43 mounted at one edge of the slot 27 and a clamp bar 44 pivotally mounted relative the clamp anvil for coaction therewith. The clamp bar 44, as seen most clearly in FIGS. 4 to 8, extends axially of the skinning cylinder as does the clamp anvil, and both extend substantially along the entire face of the skinning cylinder so that the skin may be clamped anywhere along the face of the skinning cylinder by the clamp. Accordingly, the size of the hog will not make any difference providing the length of the skinning cylinder is at least as long as the length of a hog body being skinned.

The clamp bar 44 is mounted on upper and lower arms 47 which extend from upper and lower collars 48 that are pivotally mounted on an axially extending clamp shaft 49. As seen in FIG. 3, the clamp shaft 49 is secured at opposite ends in bosses 50 and 51 carried on the upper and lower end walls 28 and 29. Arms 52 also are carried on the collars or hubs 48 and to which are pivotally connected links 53 which are in turn pivotally connected to arms or levers 54 that extend from hubs 55 which are mounted on the drive shaft 33 and keyed thereto for co-rotation therewith. Accordingly, upper and lower hubs 55 secured to the drive shaft are connected through links 53 to the supporting structure for the clamp bar 44. Any number of connections may be made between the drive shaft 33 and the clamp bar as is needed to provide the proper support therebetween.

Figures 5, 5A:
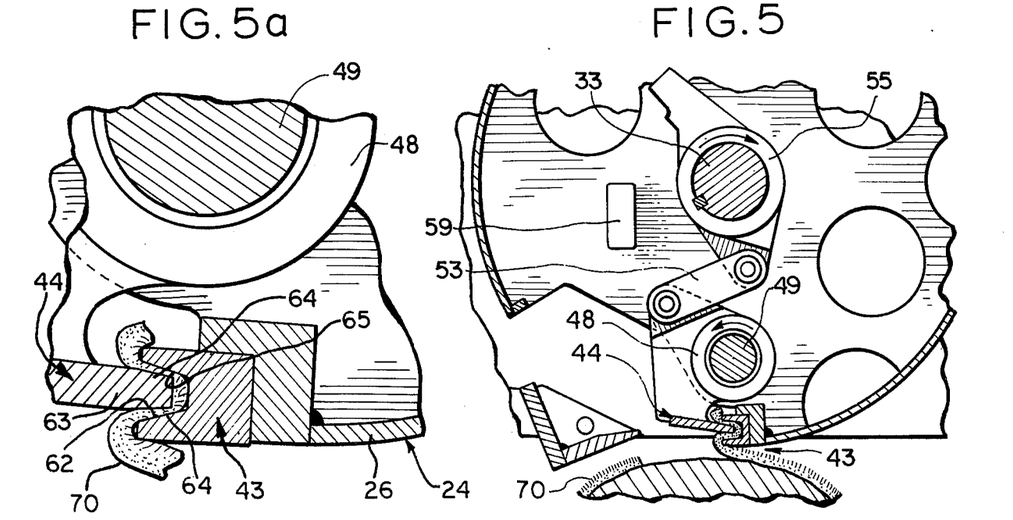
FIG. 5 is a fragmentary view similar to FIG. 4 but showing the clamp in closed position.
FIG. 5a is a still further enlarged detailed sectional view of the skin clamp illustrating the clamping action.

As seen in FIG. 5, clockwise rotation of the hubs 55 causes counter-clockwise rotation of the collars 48 on the shaft 49 which in turn causes counter-clockwise pivoting of the clamp bar 44 into engagement with the clamp anvil 43 or skin which is pinched therebetween. The open position of the clamp bar 44 is limited by a lug 58 extending from at least one of the hubs 55 which engages a stop 59 secured to the lower end wall 29.

As seen particularly in FIG. 5a, the clamp anvil 43 includes an elongated groove 62 facing the elongated slot 27 of the cylinder and for coaction with the substantially square nose 63 of the clamp bar 44. The side walls of the groove 62 are diverging outwardly and of such a dimension that it is impossible for the clamp bar nose to bottom in the groove whereby the nose edges 64 coact with the side walls 65 of the groove to pinch the skin 70 therebetween at a two point contact. Actually, the two point contact is in a sense double line contact in that the nose edges 64 are elongated and engage with the elongated walls 65 of the groove 62. This two point contact gives positive clamping action along the skin in the clamp to eliminate slippage during the skinning operation.

Figures 6, 7, 8, 9:
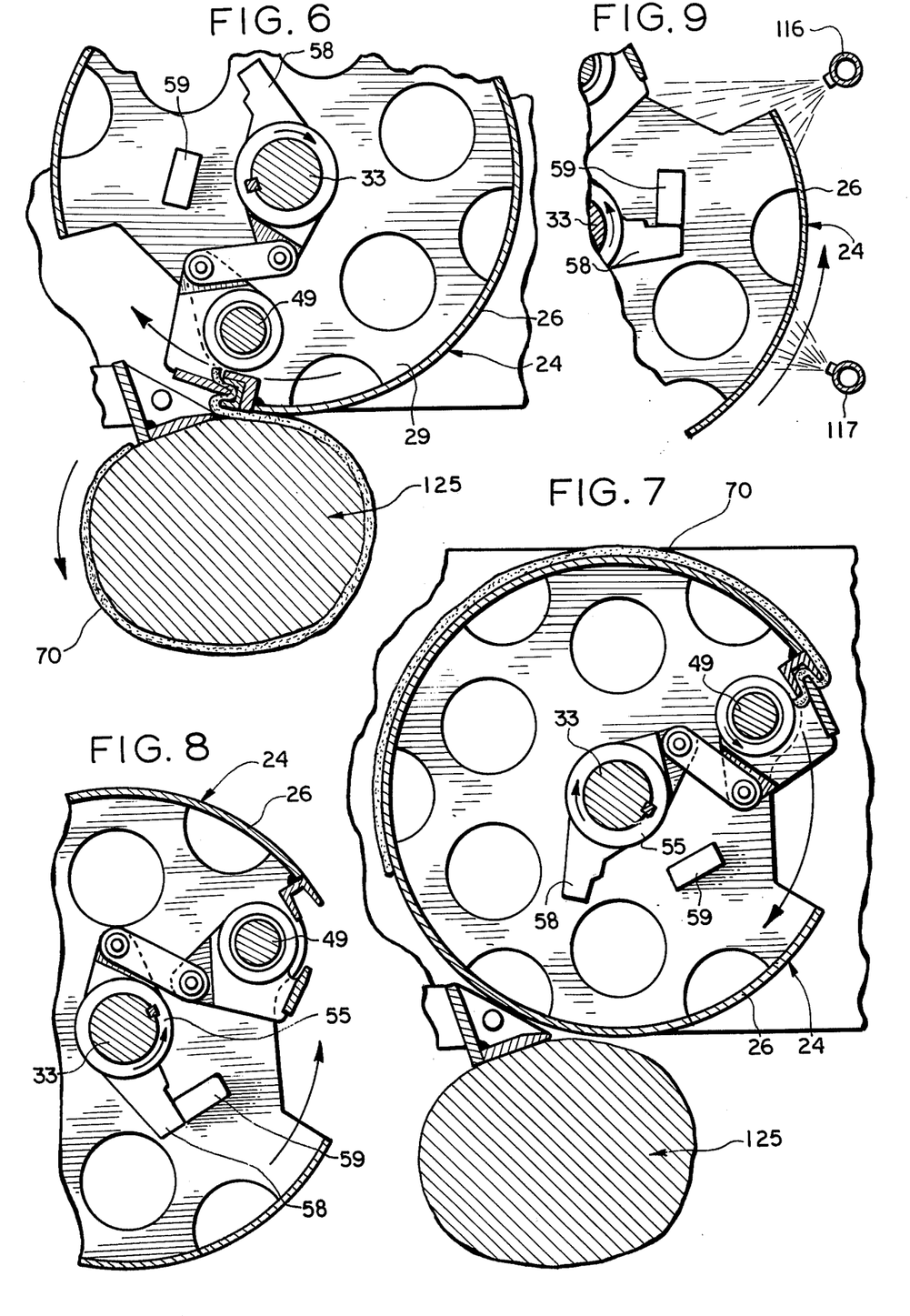
FIG. 6 is a view similar to FIG. 5 but showing movement of the skinning cylinder to bring the hog carcass into engagement with the peel bar during the initial phase of the skinning operation.
FIG. 7 is a sectional view similar to FIG. 6 and showing a further step in the skinning operation where the skin has been removed and at this point lays against the face of the skinning cylinder and is still clamped at the end of the skinning cycle.
FIG. 8 shows a fragmentary sectional view similar to FIG. 7 with some parts removed for purposes of clarity and illustrating the opening of the skin clamp thereby permitting the removed skin to fall below to a conveyer.
FIG. 9 is a fragmentary sectional view similar to FIG. 8 illustrating the step of washing down the cylinder and peel bar during the return cycle when the skinning cylinder moves to home position.

The skin clamp 42 is actuated by applying rotational movement to the drive shaft 33, and when the clamp is in closed position as shown in FIG. 5, the clamp acts as a connection between the cylinder 24 and the drive shaft 33 so that continued rotation of the drive shaft effects rotation of the cylinder. Conversely, when the clamp is open and the cylinder is being returned to its home position, the shaft 33 is connected to the cylinder for driving the cylinder back to home position through the lug 58 and the stop 59, as shown in FIGS. 8 and 9. Further, when the skinning operation has been completed, as shown in FIG. 7, where the skin 70 is wound on the cylinder face, reverse rotation of the drive shaft 33 first causes the clamp to open before commencing the return cycle of the cylinder, and when the clamp is open, the skin falls freely down from the cylinder.

Figure 10:
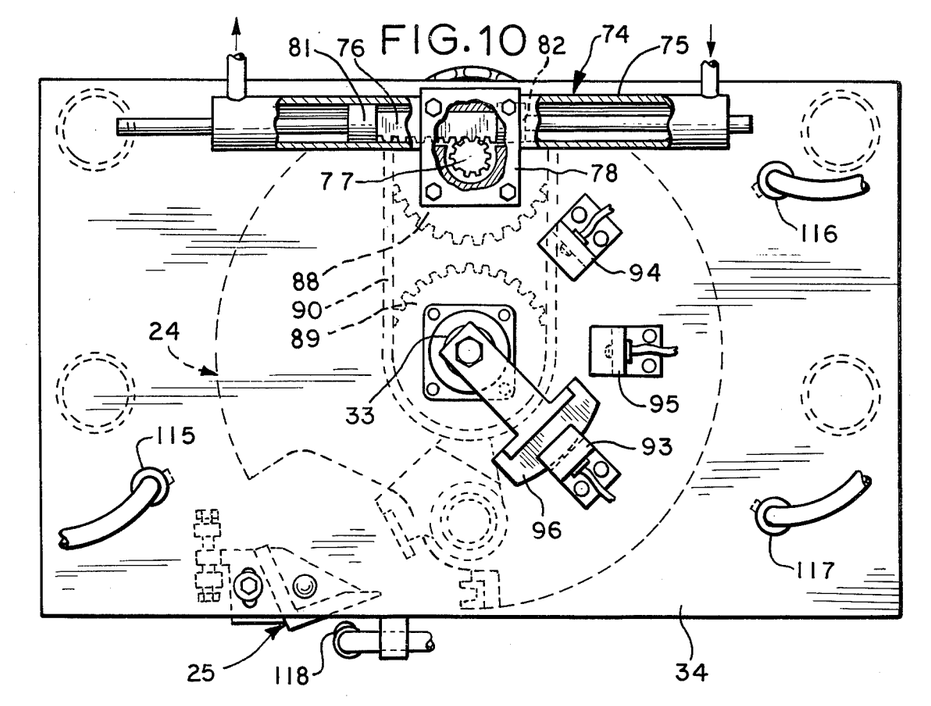
FIG. 10 is a top plan view of the machine taken generally along line 10—10 of FIG. 1 and showing some parts broken away and other parts in section for purposes of clarity.
Figure 11:
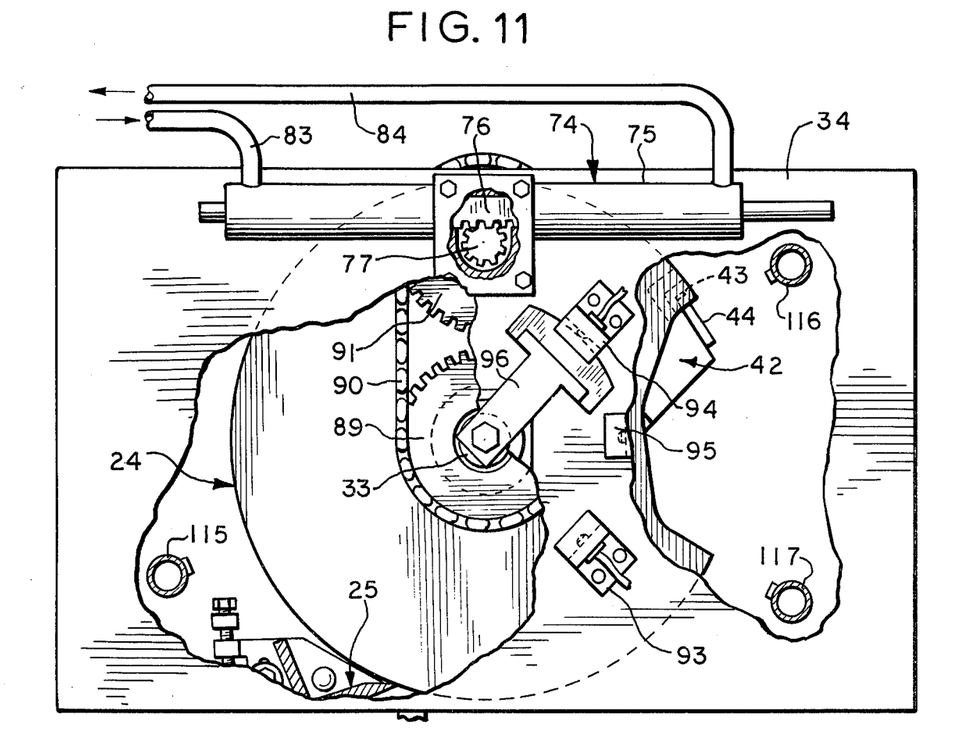
FIG. 11 is a view similar to FIG. 10 but illustrating only the limit switches and actuator together with the retarder which is mounted at the top of the machine.

In order to assure closing of the skin clamp at the beginning of the skinning cycle and opening of the skin clamp at the end of the skinning cycle and the beginning of the return cycle, retarding action is applied to the cylinder by means of a hydraulic retarder 74 illustrated in FIGS. 10 and 11. The general structure of the retarder 74 includes a cylinder 75 in which a rack gear 76 is mounted for reciprocal movement and in meshing engagement with a pinion gear 77 mounted in a housing 78 and on the end of a shaft 79 (FIG. 3) bearingly mounted in the upper mounting plate 34. The rack gear 76 is hydraulically retarded from movement within the cylinder 75 by means of piston rod assemblies 81 and 82 coacting with working chambers within the cylinder which are loaded with pressurized hydraulic fluid through opposing pressure lines 83 and 84. The pinion shaft 79 is connected to the cylinder 24 through a sprocket 88 mounted thereon in driving connection with a sprocket 89 mounted on the upper cylinder end wall 28 through a chain 90. Accordingly, a continual and constant retarding force to rotation of the cylinder 24 is effected by the hydraulic retarder 74 of such a magnitude whereby opening and closing of the skin clamp is effected during the application of driving power to the drive shaft 33. Heretofore, a friction retarder had been used which was objectionable in that it did not provide a constant retarding force.

It can now be appreciated during the initiation of the skinning cycle the drive shaft rotates to first close the skin clamp, there being a retarding force applied to the cylinder by the retarder, and when the clamp is in closed position, continued rotation of the drive shaft rotates the cylinder overcoming the resistance of the retarder and maintains the clamp in a closed position. The cylinder rotates to a predetermined position, such as about through 270°, which completes the skinning cycle. At this point, the power to the drive shaft stops, then reverses in direction to first open the clamp as the movement of the cylinder is being retarded by the retarder at the beginning of the return cycle and then drives the cylinder with the clamp in open position to the home position of the cylinder, at which time again the drive power to the drive shaft stops.

In order to control the power to the drive shaft, suitable limit switches, such as limit switches 93, 94 and 95, which are mounted on the upper mounting plate 34, are actuated by a limit switch actuator 96, which is connected to and rotatable with the cylinder 24. As viewed in FIG. 10, rotation of the cylinder through the skinning cycle drives the actuator in a clockwise direction from limit switch 93 to limit switch 94 which stops the cylinder. Likewise, the switch 93 stops the cylinder at the end of the return cycle. The limit switch 95 functions as a failsafe in the event of overrun of the cylinder in either direction due to malfunction of switches 93 and 94 wherein its actuation shuts down the entire machine. Then manual jogging is necessary to bring the cylinder to a start position. These limit switches would be connected in a suitable electrical operating circuit with the motor and start buttons actuable by the operator.

The drive shaft 33 is driven by a fluid transmission system which includes an electric motor 100 having a belt drive pulley 101 driven through a fluid coupling or torque converter 102. The drive pulley 101 has a belt 103 trained thereover and over a driven pulley 104 which is mounted for co-rotation on the input shaft 105 of a gear box 106. The output shaft of the gear box 106 is hollow, and the drive shaft 33 is inserted therein and connected thereto for co-rotation therewith. It can now be recognized the fluid coupling 102 limits the torque applied to the drive shaft and even slips when overloaded. Additionally, the fluid torque converter allows start-up of the motor 100 to develop a torque before application of same to the load. It can be appreciated that the motor 100 will be de-energized when the cylinder is in the home position and also when the cylinder has concluded the skinning cycle. The motor 100 is reversible to provide the reversible rotation of the drive shaft 33. It may be further appreciated that a rotary hydraulic motor may be provided in place of the electric motor 100 and the fluid coupling 102.

The speed of the cylinder may be controlled by the pulley ratio between the fluid transmission system and the gearbox input shaft. It has been found that a suitable speed of rotation of the cylinder is about 8.35 revolutions per minute. However, this may be increased or decreased as the conditions so require.

The peel bar 25 presents a peel edge 110 that is spaced from the face of the skinning cylinder 24 about the thickness of the skin being removed from the hog carcass. The peel bar 25 is stationarily mounted between the upper and lower mounting plates 34 and 35. However, it includes adjusting mechanism 111 for varying the spacing of the peel edge 110 relative the face of the cylinder as may be necessary to handle heights of different skin thicknesses. It will be appreciated the peel edge 110 need not be sharp as it does not perform a cutting operation but merely performs a peel operation relative to separating the skin from the carcass and particularly from the fat layer on the carcass.

During the return stroke, a plurality of spray nozzles 115, 116, 117 and 118 (FIG. 4) are operated to wash down the outer face of the skinning cylinder and the peel bar so that the cylinder and the peel bar are clean and ready for the next skinning operation when the cylinder has reached home position. The washing cycle is automatic with the return cycle of the cylinder, and the return cycle is automatically timed with the movement of the hog carcass as it is withdrawn from the machine after the skinning operation.

When a hog carcass is brought into alignment with the machine, as illustrated by the trolley 18a in FIG. 2, the trolley is positioned on a movable track section 17a which is movable toward and away from the skinning machine, as illustrated in FIG. 1. Any suitable support may be provided for the track section 17a, such as a brace 120, and any suitable drive may be provided for reciprocating the trolley between the solid and dotted line positions shown in FIG. 1, such as a pneumatic actuator 121. Movement of the hog carcasses onto and off the track section 17a are in timed relation with respect to movement of hog carcasses along the track 17. Further, actuation of the track section 17a between the positions shown in FIG. 1 is automatically timed in relation to the operation of the skinning machine. When the track section is being driven toward the machine to lay the hog carcass against the skinning cylinder, the operator assists in properly positioning the carcass so that the operator can then insert the loose flap 70a of skin on the hog carcass 125 into the slot 27 of the cylinder and between the clamp anvil and the clamp bar. Thereafter, the operator turns away from the machine and must use both hands to depress a pair of spaced apart buttons to initiate the skinning-return cycles. As already explained, the motor 100 would be energized to commence driving of the drive shaft 33 to first close the skin clamp and clamp the skin to the skinning cylinder and thereafter to drive the skinning cylinder in a direction, as shown successively in FIGS. 4, 5, 6 and 7, to force the hog carcass against the peel bar 25 and to peel the skin or hide from the carcass. Once the skinning cycle has been completed, the motor 100 stops, and after a suitable time delay, reverses to reverse the driving power to the drive shaft for opening of the skin clamp which allows the skin to fall from the skinning cylinder and onto a conveyer 130 arranged below the skinning cylinder which carries the skin away from the machine and to a further process station. Thereafter, the continued reverse driving of the drive shaft returns the skinning cylinder to its home position, and during this return cycle, the cylinder and peel bar is washed down with a suitable washing liquid, such as plain or conditioned water, at a suitable temperature so that the cylinder and peel bar are clean for the next successive skinning operation. Prior to the commencement of the return cycle, the skinned hog carcass is removed from the machine wherein the track section 17a is brought back to alignment with the track run 17 so that the hog carcass can be advanced to another processing station. Further, the hog carcass then does not interfere in any way with the movement of the skinning cylinder to its home position.

In order to assist in properly positioning of the hog initially against the skinning cylinder, a hog rest bar 133 (FIG. 2) is provided. This also prevents the hog from falling down the side of the cylinder away from the open slot where the skin clamp is located.

In order to further assure proper operation of the skinning cylinder, a hydraulic disk brake assembly 135, which includes a caliper 136 coacting with a disk 137 mounted on the input shaft 105 of the gear box, as seen in FIGS. 2 and 3, is activated at the completion of cylinder rotation to prevent any further rotation. More specifically, when the cylinder has reached the end of the skinning cycle and the motor 100 is de-energized, the brake 135 would be energized. Similarly, when the cylinder completes the return cycle and the motor 100 is de-energized, the brake 135 would be energized. During rotational movement of the cylinder, the brake 135 would be de-energized.

It may be further appreciated that inasmuch as the driving force applied to rotate the cylinder through the skinning cycle is applied through the drive shaft and the skin clamp, the clamping pressure is self-generating and an increase in resistance to the peeling or pulling of the hide from the carcass produces a greater clamping pressure. In this respect, the clamping pressure will in most cases be a function of the animal size.

It will be understood that modifications and variations may be effected without departing from the scope of the novel concepts of the present invention, but it is understood that this application is to be limited only by the scope of the appended claims.

The invention is hereby claimed as follows:

1. A skinning machine comprising,
an elongated cylinder rotatably mounted along an inclined axis and having an axially extending slot,
powered retarding means connected to the cylinder for continually retarding rotation of the cylinder,
a skin clamp along the slot for clamping a portion of the animal skin longitudinally of the carcass,
an elongated stationary peel bar arranged along the cylinder and parallel to the outer surface thereof and spaced therefrom about the thickness of the skin for engaging the animal carcass during the skinning thereof,
means connected to the clamp coacting with the retarding means to first drive the clamp to closed skin-clamping position and thereafter to effectively connect the clamp to the cylinder and rotatably drive the cylinder relative the peel bar to remove the skin from the carcass,
and brake means energized when the driving means is at rest for preventing rotation of the cylinder.

2. The combination as defined in claim 1, wherein said retarding means includes a hydraulic motor.

3. The combination as defined in claim 2, wherein the hydraulic motor includes means preventing damage thereof if the cylinder fails to stop.

4. The combination as defined in claim 1, which further includes means for washing the cylinder and peel bar subsequent to a skinning operation.

5. The combination as defined in claim 4, wherein said washing means includes a plurality of nozzles spraying a washing liquid onto the cylinder and peel bar.

6. The combination as defined in claim 1, wherein said skin clamp includes a stationary clamp anvil coacting with a movable clamp bar, said clamp anvil having a groove into which the clamp bar engages, said anvil and bar being formed to produce a two point engagement with the skin when in clamping position.

7. The combination as defined in claim 1, wherein said clamp and cylinder drive means includes a fluid coupling to limit the application of torque.

8. A hog skinning machine for peeling skin from a hog carcass where the hog has been prepared to provide a portion of loose skin longitudinally of the carcass, said machine comprising,
a shaft rotatably supported along an inclined axis,
an elongated cylinder rotatably supported on said shaft and having an external face with an axially extending slot,
a skin clamp at said slot including a clamp anvil mounted along one side of the slot and a clamp bar pivotally mounted within said cylinder for movement between an open position where the loose skin may be inserted between the anvil and bar and a closed position where the skin is clamped between the anvil and bar,
connection means between said shaft and clamp bar for closing said clamp upon rotation of said shaft in one direction when the cylinder is stationary, said connection means including a hub mounted on the shaft for rotation therewith, and a link pivotally connected at one end to an arm extending from said hub and pivotally connected at the other end to an arm extending from the clamp bar, reversible drive means for driving said shaft, hydraulic means connected to said cylinder for retarding rotation of same in either direction and coacting with said drive means to cause the clamp bar to move between open and closed positions, said drive means rotationally driving said cylinder in one direction upon closing of said clamp by connection of said cylinder through said clamp and said connection means to define the skinning cycle, stop means limiting the open position of said clamp bar and connecting said cylinder to said shaft for driving the cylinder in the return direction to define the return cycle, and an elongated stationary peel bar extending axially of the cylinder spaced from the cylinder face about the thickness of the hog skin for engaging the hog carcass during the skinning cycle and preventing same from moving with the cylinder.

9. The combination as defined in claim 8, wherein said reversible drive means includes a reversible motor, a gear box having an input shaft and an output shaft, a fluid coupling connecting said motor to said input shaft, and means connecting the output shaft to said inclined shaft.

10. The combination as defined in claim 9, which further includes a brake on said input shaft energizable when the drive means is at rest to prevent rotation of the cylinder.

11. The combination as defined in claim 8, wherein said clamp anvil includes a skin receiving groove and said clamp bar coacts with said anvil to engage in the groove and establish a two point contact with the groove when clamping the skin in place.

12. The combination as defined in claim 11, wherein the groove includes diverging side walls and said clamp bar includes a substantially square nose.

13. The combination as defined in claim 8, which further includes means for washing the cylinder face and peel bar during the return cycle.

14. The combination as defined in claim 13, wherein said washing means includes a plurality of spray nozzles for spraying a washing liquid onto the cylinder face and peel bar.

15. In a system for skinning a hog which includes a machine for peeling skin from a hog carcass where the hog has been prepared to provide a portion of loose skin longitudinally of the carcass and an overhead track extending adjacent the machine along which hog carcasses gambrelled by the hind legs are moved to and from the machine, said machine including a rotatable cylinder mounted along an axis inclined away from the track having an axially extending slot and a skin clamp at the slot and a stationary peel bar adjacent the cylinder against which the hog carcass engages during rotation of the cylinder, and said track having a movable section at the machine for transferring a carcass from the track run to a position at the machine, a method of handling and skinning the hog carcass comprising the steps of:

positioning the carcass at the movable track section, moving the track section toward the machine to position the hog against the cylinder, inserting the loose skin in the slot for engagement by the clamp, closing the clamp to connect the skin to the cylinder, rotating the cylinder to drive the carcass against the peel bar and peel the skin from the carcass, moving the track section back to the track run thereby moving the carcass away from the machine, unclamping the skin to allow it to fall away from the cylinder, and returning the cylinder to the home position for the next successive skinning operation.

16. The method of claim 15, which further includes the step of washing the cylinder and peel bar as it returns to home position.

* * * * *